United States Patent
Pecho

(10) Patent No.: US 9,109,620 B2
(45) Date of Patent: Aug. 18, 2015

(54) FASTENER

(75) Inventor: Joerg Pecho, Forchtenberg (DE)

(73) Assignee: Arnold Umformtechnik GmbH & Co. KG, Forchtenberg-Ernsbach (DE)

( * ) Notice: Subject to any disclaimer, the term of this patent is extended or adjusted under 35 U.S.C. 154(b) by 29 days.

(21) Appl. No.: 13/566,165

(22) Filed: Aug. 3, 2012

(65) Prior Publication Data

US 2013/0034404 A1 Feb. 7, 2013

(30) Foreign Application Priority Data

Aug. 5, 2011 (DE) .......................... 10 2011 080 505

(51) Int. Cl.
*F16B 37/06* (2006.01)

(52) U.S. Cl.
CPC .................................. *F16B 37/068* (2013.01)

(58) Field of Classification Search
USPC .................................. 411/179, 180, 181, 491
See application file for complete search history.

(56) References Cited

U.S. PATENT DOCUMENTS

| | | | | |
|---|---|---|---|---|
| 1,107,544 A | * | 8/1914 | Ogden | 411/183 |
| 2,147,343 A | * | 2/1939 | Hokansom | 403/284 |
| 2,415,695 A | * | 2/1947 | Kann | 411/180 |
| 2,544,304 A | * | 3/1951 | Eckenbeck et al. | 411/180 |
| 3,399,705 A | * | 9/1968 | Breed et al. | 411/180 |
| 3,443,617 A | * | 5/1969 | Whiteside et al. | 411/180 |
| 3,910,331 A | * | 10/1975 | Randall | 411/181 |
| 4,432,681 A | * | 2/1984 | Capuano | 411/180 |
| 5,207,588 A | * | 5/1993 | Ladouceur et al. | 439/84 |
| 5,302,066 A | * | 4/1994 | Bieschke et al. | 411/181 |
| 6,712,370 B2 | * | 3/2004 | Kawada et al. | 280/124.155 |
| 2005/0180838 A1 | | 8/2005 | Shinjo | |
| 2007/0151091 A1 | * | 7/2007 | Babej et al. | 29/509 |
| 2010/0209211 A1 | * | 8/2010 | Babej et al. | 411/173 |
| 2011/0067478 A1 | | 3/2011 | Babej | |
| 2011/0211932 A1 | | 9/2011 | Babej | |
| 2012/0028070 A1 | | 2/2012 | Babej et al. | |
| 2012/0102712 A1 | | 5/2012 | Babej | |

FOREIGN PATENT DOCUMENTS

| | | |
|---|---|---|
| DE | 19854792 A1 | 5/2000 |
| DE | 102004042478 A1 | 3/2006 |
| DE | 102005030716 A1 | 1/2007 |

* cited by examiner

*Primary Examiner* — Flemming Saether
(74) *Attorney, Agent, or Firm* — Boyle Fredrickson, S.C.

(57) ABSTRACT

A press-fit component is proposed, which can be both press-fitted into an existing hole in a sheet metal component and also punched into sheet metal where there is no hole. The press-fit component exhibits a head with a bearing surface and a shaft which emanates from the bearing surface. The shaft has a trilobular cross-section and may be provided with knurling over at least part of its length. The shaft may be provided with a threaded through-hole. As a result of the trilobular form, the shaft and with it the press-fit element is secured against turning, without deformation of the sheet metal from a plane taking place during press-fitting.

10 Claims, 4 Drawing Sheets

FASTENER

This application claims the priority of the German patent application 10 2011 080 505 dated Aug. 5, 2011. The whole disclosure of this prior application is herewith incorporated by reference into this application.

The invention relates to a fastening element or functional element, which is fixed by press-fitting to a metallic part.

A functional element which can be fixed in a sheet metal part exhibiting a hole is already known in the art. This functional element has an annular collar projecting from a bearing surface, said collar being inserted into the opening in the sheet metal part and outwardly formed on the opposite side with the help of a riveting tool. The opening in this case may be elliptical (DE 10 2004 042 478 A1). Due to the forming of the collar, this functional element is only intended for relatively thin sheet metal parts.

Furthermore, a piercing nut is known (DE 10 2005 006 396 A1), which is placed with an end section on sheet metal and a hole is punched. Fixing is achieved in that the edge of the hole which is created is formed in a recess in the piercing nut.

The problem addressed by the invention is that of creating a fastening element, which can be connected to a sheet metal part, such that no excessive deformation of the sheet metal part from the plane of said sheet metal part is required. The fastening element should therefore also be suitable for thicker sheet metals, which can only be deformed at greater expense.

To solve this problem, the invention proposes a press-fit component having the features referred to in claim 1. Developments of the invention are the subject-matter of dependent claims.

The press-fit component therefore contains a head element with a flat bearing surface, from which the shaft extends at right angles to the bearing surface. Due to the polylobular cross-section of the shaft, fixing in the direction of rotation can take place through interaction with an opening exhibiting an identical shape. The axial fixing of the press-fit component may be achieved by a non-positive connection in this case. The non-positive connection may be produced by a narrow fit, for example, or by subsequent deformation with the help of a riveting tool, for example.

The press-fit component proposed by the invention may be pressed into a correspondingly shaped available opening. The press-fitting may take place such that fixing occurs not only in the direction of rotation, but also in the extraction direction, insofar as this is necessary.

In a development of the invention, it may be provided that the press-fit component exhibits a punching edge on the free end of its shaft. This is a sharp, edge. It is thereby possible to use the press-fit component as a punching component too, so that it can also be used in conjunction with a die plate to produce the correspondingly formed hole in a piece of sheet metal. In this case, the punching of the hole and press-fitting of the shaft into the hole thereby produced can take place in an operating cycle.

In a development of the invention, it may be Provided that the shaft exhibits a smooth outer face over at least part of its longitudinal extension, starting from its free end.

This smooth outer face may not only be provided over part of the axial extension of the shaft, but also over its entire length up to the bearing surface of the head in a press fit component 900, as shown in FIG.9.

It is, however, likewise possible and is Proposed by the invention that the shaft exhibits knurling over at least part of its extension. This knurling may serve to improve the fixing of the press-fit component in the hole in the sheet metal.

For example, the knurling may be formed at least in part as longitudinal knurling. Longitudinal knurling, in which the ribs run in an axial direction relative to the shaft, serves primarily to improve the press-fit and also the securing against rotation by improved positive locking in a press fit component 800, as shown in FIG.8A.

In a development of the invention, it may be provided that the knurling is formed at least in part as transverse knurling. Securing against any pulling or pushing of the press-fit component out of the hole should thereby be improved.

A further possibility for improving the hold of the press-fit component in the hole and for improving the positive connection may be provided in that the knurling is formed at least in part as cross-knurling in a press fit component 805, as shown in FIG. 8B.

It goes without saying that combinations of different kinds of knurling are also possible and practical.

The press-fit component may exhibit an axial opening, particularly a through-hole, for example. It may be used in this way to support different objects. In the case of a blind hole, this may either emanate from the free end of the shaft or from the opposite end, in other words be present in the actual head of the press-fit component.

In the case of both a blind hole and also a through-hole, a thread may be present, so that an object can be screwed into the press-fit component.

It is also possible for a journal, which may be used as a bearing journal, for example, to be arranged on the press-fit component, preferably on the head. It may also exhibit an external thread.

Further features, details and advantages of the invention emerge from the claims and the abstract—the wording in both cases made by reference to the content of the description—of the following description of preferred embodiments of the invention and also with the help of the drawing. In this:

Figure 1:
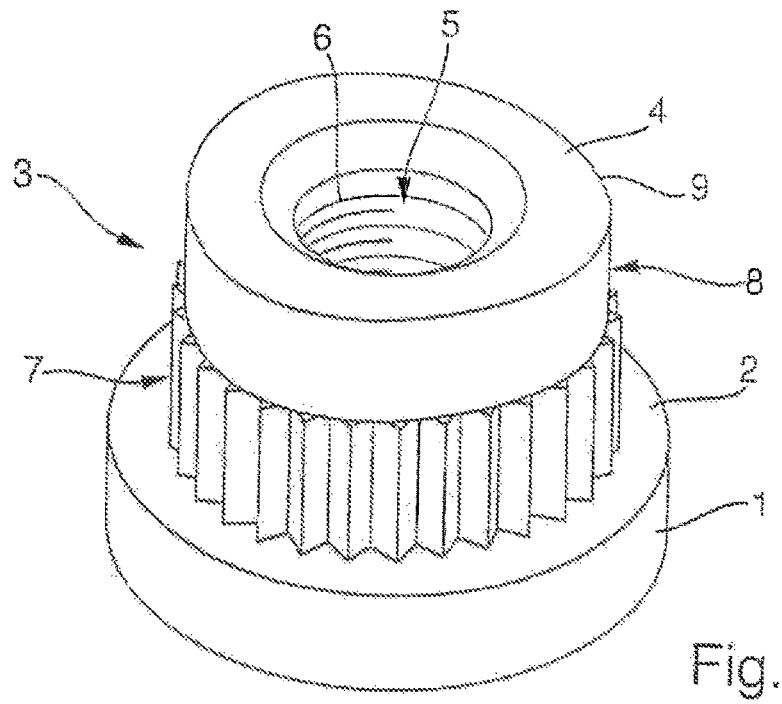
FIG. 1 shows a perspective view of a press-fit component according to the invention.

The press-fit element according to the invention shown in FIG. 1 contains a head 1, which is in the form of a flat cylinder and exhibits a circular cross-section, for example. On the underside of the head 1 visible in FIG. 1, a bearing surface 2 is formed, which lies on a plane. A shaft 3, which ends in a flat end face 4, extends from this underside 2, A through-hole 5 extends through the shaft 3 and through the head 1, said hole being provided with an internal thread 6.

The shaft 3 contains a first section 7 on its outer face, said section emanating from the bearing surface 2 of the head 1 and being connected to a second section 8, which extends up to the end face 4 of the shaft 3.

The first section 7 of the shaft 3 is provided with longitudinal knurling with sharp edges.

The second section 8 exhibits a smooth outer face.

The line of intersection between the second section 8 of the shaft 3 and the end face 4 thereof forms a punching edge 9.

The cross-section of the shaft 3 deviates from a circular form. This can be seen in FIG. 1, but it becomes clearer in FIG. 2, Particularly by making a comparison between the punching edge 9 and the outer periphery 10 of the head 1, it can be seen that the punching edge 9 approaches the outer periphery 10 of the head 1 at 3 points and moves away from the outer periphery 10 between these points. This form is referred to as trilobular.

Figure 2:
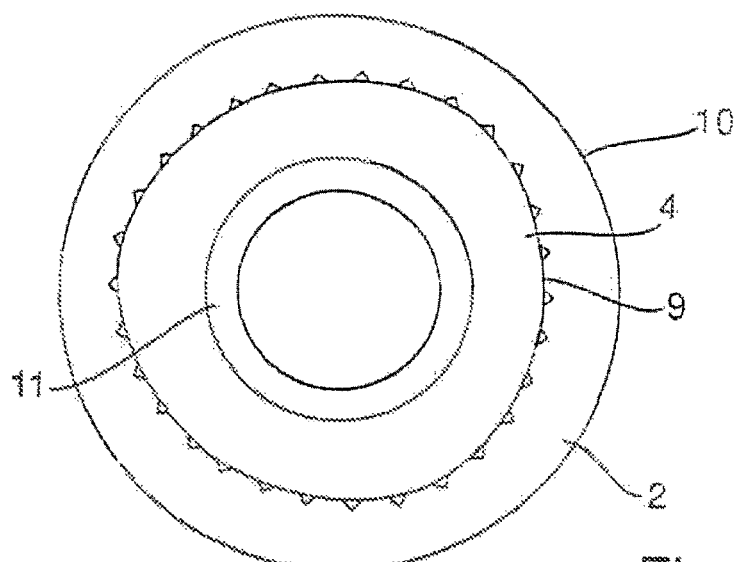
FIG. 2 shows a top view of the press-fit component from the side of the journal.

Furthermore, it can be inferred both from FIG. 1 and also from FIG. 2 that the threaded bore 5 exhibits a bevel 11 on the end face 4.

The press-fit component represented in FIGS. 1 and 2 may be press-fitted into an opening which exists in a sheet metal part, said opening being geometrically similar to the form of the shaft and being slightly smaller, so that fixing can take place by clamping.

Due to the punching edge 9 already mentioned, the press-fit component may also be used, however, in a sheet metal part without an opening to, produce such an opening itself by punching, Press-fitting into this opening can then take place in the same process.

Figure 3:
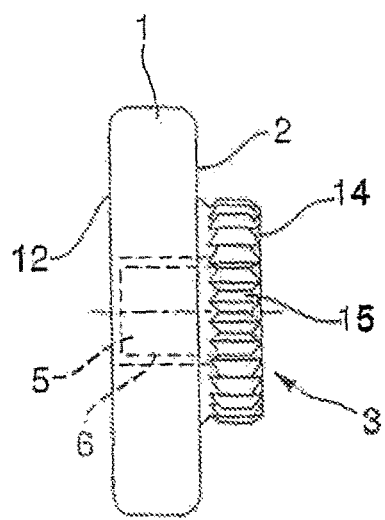
FIG. 3 shows a side view of a press-fit component according to a $2^{nd}$ embodiment.
Figure 4:
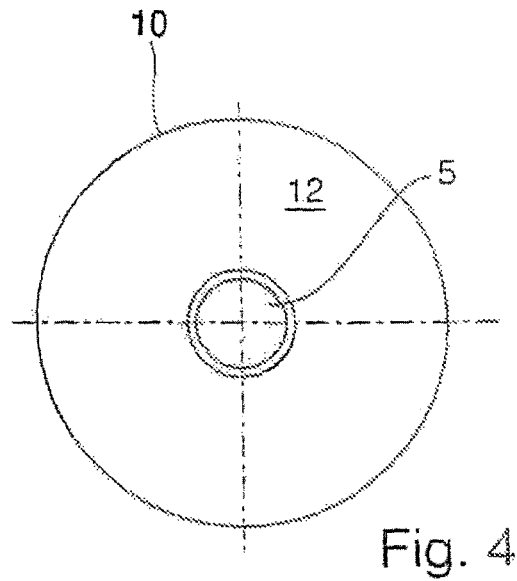
FIG. 4 shows a top view from the left in FIG. 3.
Figure 5:
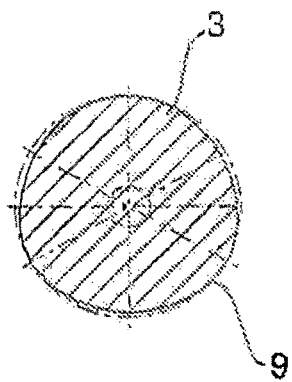
FIG. 5 shows a cross-sectional view through the journal of the press-fit component in FIG. 3 and FIG. 4.

While in the embodiment according to FIG. 1 and FIG. 2, a smooth section 8 is initially connected to the flat end face 4 of the shaft 3, the following FIGS. 3 to 5 show an embodiment in which the knurling extends as far as the end face 14. The press-fit component in turn contains a head 1 with a flat underside which forms a bearing surface 2. Opposite the underside, the head 1 has a flat front edge 12. The press-fit component is penetrated by an axial bore 5 which is indicated, said bore being provided with a thread 6. Longitudinal knurling 15 is formed on the outer face of the shaft 3.

FIG. 4 shows the press-fit component in FIG. 3 from the left. The through-hole 5 can be seen here, which is therefore accessible from both sides of the press-fit component.

FIG. 5 now shows once again across-section through the shaft 3 at a point between the bearing surface 2 and the longitudinal knurling 15. Here, too, the deviation between the punching edge 9 and the circular periphery indicated can be seen.

Figure 6:
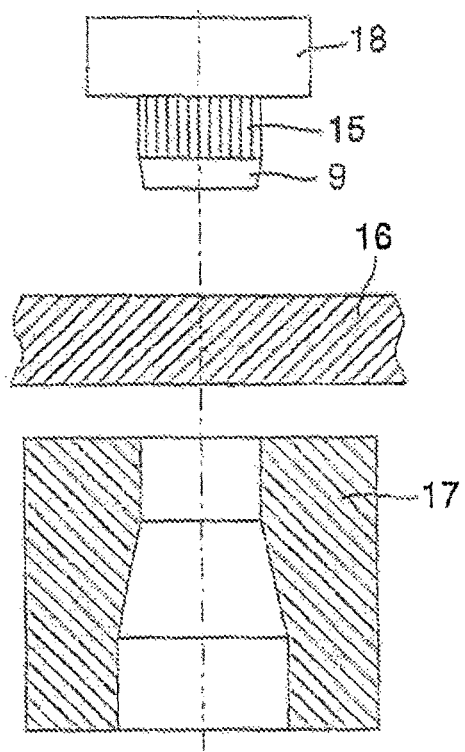
FIG. 6 shows in schematic form the configuration of a press-fit component before press-fitting.
Figure 7:
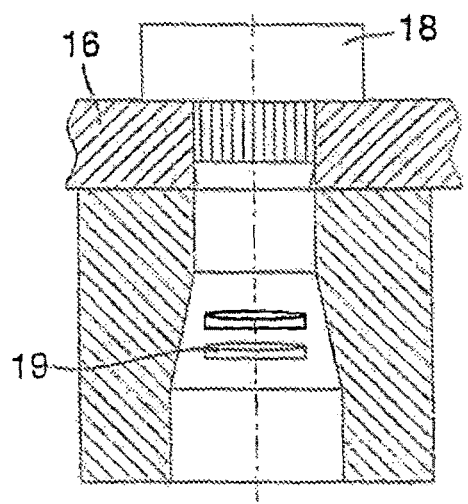
FIG. 7 shows the configuration of the press-fit component after press-fitting.

The following two FIGS. 6 and 7 show in schematic form the way in which a press-fit component of this kind is used. A metallic sheet metal part 16 is present, A die plate 17 is disposed beneath the sheet metal part and above the sheet metal part is the press-fit component 18, This involves a press-fit component which corresponds to the embodiment according to FIG. 1 and FIG. 2. The die plate has an opening on its side facing the sheet metal part 16, which roughly matches the size of the hole to be produced. The sheet metal part 16 is placed on the die plate 17. The press-fit component 18 is then aligned relative to the die plate 17 and placed on the sheet metal part 16 and pressed forwards with corresponding force. The press-fit component thereby punches a hole in the sheet metal part 16 with its punching edge 9 and when the press-fit component 18 is pushed further forwards, the longitudinal knurling 15 comes into contact with the wall of the hole which is produced. The longitudinal knurling 15 is buried in the wall of the hole. The end result is that the press-fit component 18 is connected to the sheet metal part 16, the pressed out parts 19 of the sheet metal 16 fall away downwards.

In the exemplary embodiment shown in FIGS. 6 and 7, the press-fit component is press-fitted into a sheet metal part. It may also be used, however, to connect two sheet metal parts to one another.

Figure 8:
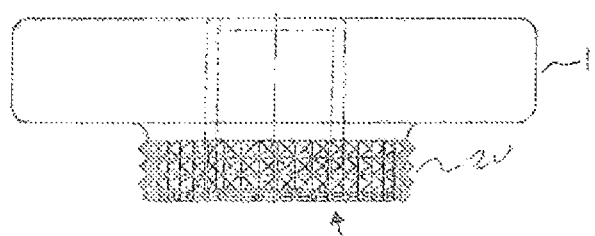
FIG. 8 shows a side view of a press-fit component including cross knurling.
Figure 9:
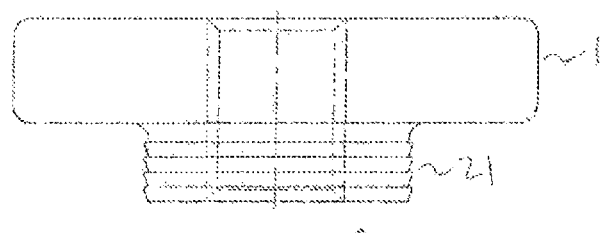
FIG. 9 shows a side view of a press-fit compontnt including traverse knurling.

FIG. 8 shows the press-fit component 1 having cross knurling 20 formed on the outer face of the shaft 3. FIG. 9 shows the press-fit component 1 having transverse knurling 21 formed on the outer face of the shaft 3.

The shaft acquires its knurling by rolling. The ribs are produced in this case by pressing in recesses between the ribs, which are deeper than the smooth part of the shaft.

The shaft exhibits the form of a curve of constant width (constant diameter cam/tri-rondular configuration) in the initial state. Only in this way is it possible for the knurling to be produced by rolling, in other words without machining.

The invention claimed is:

1. Press-fit component having a cylindrical shaft (3),
a head (1), which
is disposed at one end of the shaft (3),
projects radially above the outside surface of the shaft (3) on all sides and exhibits a flat bearing surface (2) on its side assigned to the shaft (3),
wherein a cross-section of the shaft (3) is trilobular in form, and
further wherein the shaft (3) exhibits knurling (15) over at least part (7) of its extension.

2. Press-fit component according to claim 1, having a punching edge (9)formed on the free end of the shaft (3).

3. Press-fit component according to claim 1,
wherein the shaft (3) exhibits a smooth outer face
over at least part (8)of its longitudinal
extension, starting from its free end.

4. Press-fit component according to claim 1,
wherein the knurling is formed at least in part as longitudinal knurling (15).

5. Press-fit component according to claim 4, wherein the knurling is produced by rolling.

6. Press-fit component according to claim 5, wherein the recesses between the ribs in the knurling are deeper than the initial state of the shaft and deeper than the surface of the smooth shaft section.

7. Press-fit component according to Claim 1,
wherein the knurling is formed at least in part as transverse knurling.

8. Press-fit component according to claim 1,
wherein the knurling is formed at least in part as cross-knurling.

9. Press-fit component according to claim 1,
wherein the shaft (3) exhibits an axial opening (5), particularly a through-hole (5)

10. Press-fit component according to claim 9, wherein the opening (5)exhibits a thread (6).

\* \* \* \* \*